United States Patent

Hepburn et al.

[11] Patent Number: 5,626,014
[45] Date of Patent: May 6, 1997

[54] CATALYST MONITOR BASED ON A THERMAL POWER MODEL

[75] Inventors: Jeffrey S. Hepburn, Dearborn; Allen H. Meitzler, Ann Arborn, both of Mich.

[73] Assignee: Ford Motor Company, Dearborn, Mich.

[21] Appl. No.: 497,562

[22] Filed: Jun. 30, 1995

[51] Int. Cl.$^6$ ............................................. F01N 3/20
[52] U.S. Cl. ................................. 60/274; 60/277
[58] Field of Search .................... 60/274, 277, 285

[56]  References Cited

U.S. PATENT DOCUMENTS

| | | |
|---|---|---|
| 5,177,463 | 1/1993 | Bradshaw et al. . |
| 5,255,511 | 10/1993 | Maus et al. . |
| 5,339,628 | 8/1994 | Maus et al. . |
| 5,355,671 | 10/1994 | Maus et al. . |
| 5,431,012 | 7/1995 | Narula ................................. 60/285 |

FOREIGN PATENT DOCUMENTS

| | | |
|---|---|---|
| WO8807622 | 10/1988 | WIPO . |
| 88/07622 | 10/1988 | WIPO . |

*Primary Examiner*—Douglas Hart
*Attorney, Agent, or Firm*—Lorraine S. Melotik; Roger L. May

[57]  ABSTRACT

An on-board monitoring system for estimating the hydrocarbon conversion efficiency of a vehicle catalytic converter receives temperature signals from a plurality of temperature sensors positioned to detect the temperature of exhaust gas entering the catalytic converter and to detect the temperature of the catalyst substrate in the catalytic converter at spaced positions along the direction of flow. Diagnostic routine initiation tests are performed to determine if the vehicle is operating within an acceptable range, and if so, then a plurality of sets of temperature values are measured and stored over a plurality of time intervals. During the time intervals, several engine operating parameters are checked to determine if the vehicle is operating within a range which conforms approximately to the range of operation encountered in the Federal Test Procedure (FTP). Upon expiration of the time intervals, a total energy value, indicative of the thermal energy developed in the catalytic converter over the plurality of intervals is generated and compared to a predetermined value. If the calculated energy value deviates from the predetermined value by more than a predetermined deviation amount, a malfunction indicator light is set to indicate excessive deterioration of the catalytic converter.

10 Claims, 4 Drawing Sheets

5,626,014

CATALYST MONITOR BASED ON A THERMAL POWER MODEL

FIELD OF THE INVENTION

This invention relates generally to the field of engine controls and more particularly to diagnostic mechanisms and procedures for determining the operability and efficacy of a vehicle catalytic converter used for the reduction of exhaust gas emissions.

BACKGROUND OF THE INVENTION

Diagnostic techniques for determining the operability and efficacy of three-way catalytic (TWC) converters are commonly used on vehicles to comply with federal and/or state emission control regulations. Typically, such techniques attempt to measure catalyst oxygen storage capacity by utilizing a Heated Exhaust Gas Oxygen (HEGO) sensor positioned upstream of the TWC converter and a HEGO sensor positioned downstream of the TWC converter to detect the oxygen equilibrium concentration in the exhaust gas entering and exiting the converter. An electronic engine controller receives the signal generated by each of the sensors and determines the operability and/or efficacy of the converter as a function of the output of the two HEGO sensors.

The inventors herein have discovered that such techniques suffer from a number of deficiencies, the most notable of which is the lack of a complete correlation between oxygen storage capacity, which is determined by way of dual HEGO sensors, and catalyst conversion efficiency. In addition, the use of the aforementioned technique depends upon the volume of the converter and may not work satisfactorily for small-volume, close-coupled catalysts like those planned for use on certain low-emission vehicles. In addition, certain types of fuel additives and naturally occurring chemicals, such as fuel sulfur, can adversely affect the performance of the aforementioned techniques.

It is accordingly an object of the present invention to provide a system for diagnosing the operation of a catalytic converter which overcomes the aforementioned deficiencies of known diagnostic techniques.

SUMMARY OF THE INVENTION

In a first aspect of the invention, an on-board monitoring system for a vehicle includes a means for initiating a catalytic converter diagnostic test, and a means, which is responsive to the initiation of the diagnostic test and which is responsive to a plurality of temperature sensing devices positioned at spaced intervals upon the catalytic converter, for generating a plurality of temperature values. Each of the temperature values is indicative of the temperature detected by a corresponding temperature sensing device. A means which is responsive to at least one engine operating parameter, determines if the engine is operating within a predetermined operating range, and a means which is responsive to the engine operating within the predetermined range, stores the temperature values for a plurality of time intervals to generate a set of stored temperature values. Upon expiration of the time intervals, the set of stored temperature values is retrieved and a total power value which is indicative of the thermal power generated by the catalytic converter during the time intervals is generated. The total power value is compared to a predetermined power value, and an indication is provided if the total power value deviates from the predetermined power value by more than a predetermined deviation amount.

An advantage of certain preferred embodiments is that an accurate diagnosis, which is relatively insensitive to common fuel additives, of catalytic converter operation can be performed for converters having a wide range of volumes and which are installed in either spark-ignited or diesel engines.

These and other features and advantages of the present invention may be better understood by considering the following detailed description of a preferred embodiment of the invention. In the course of this description, reference will frequently be made to the attached drawings.

DETAILED DESCRIPTION

Figure 1:
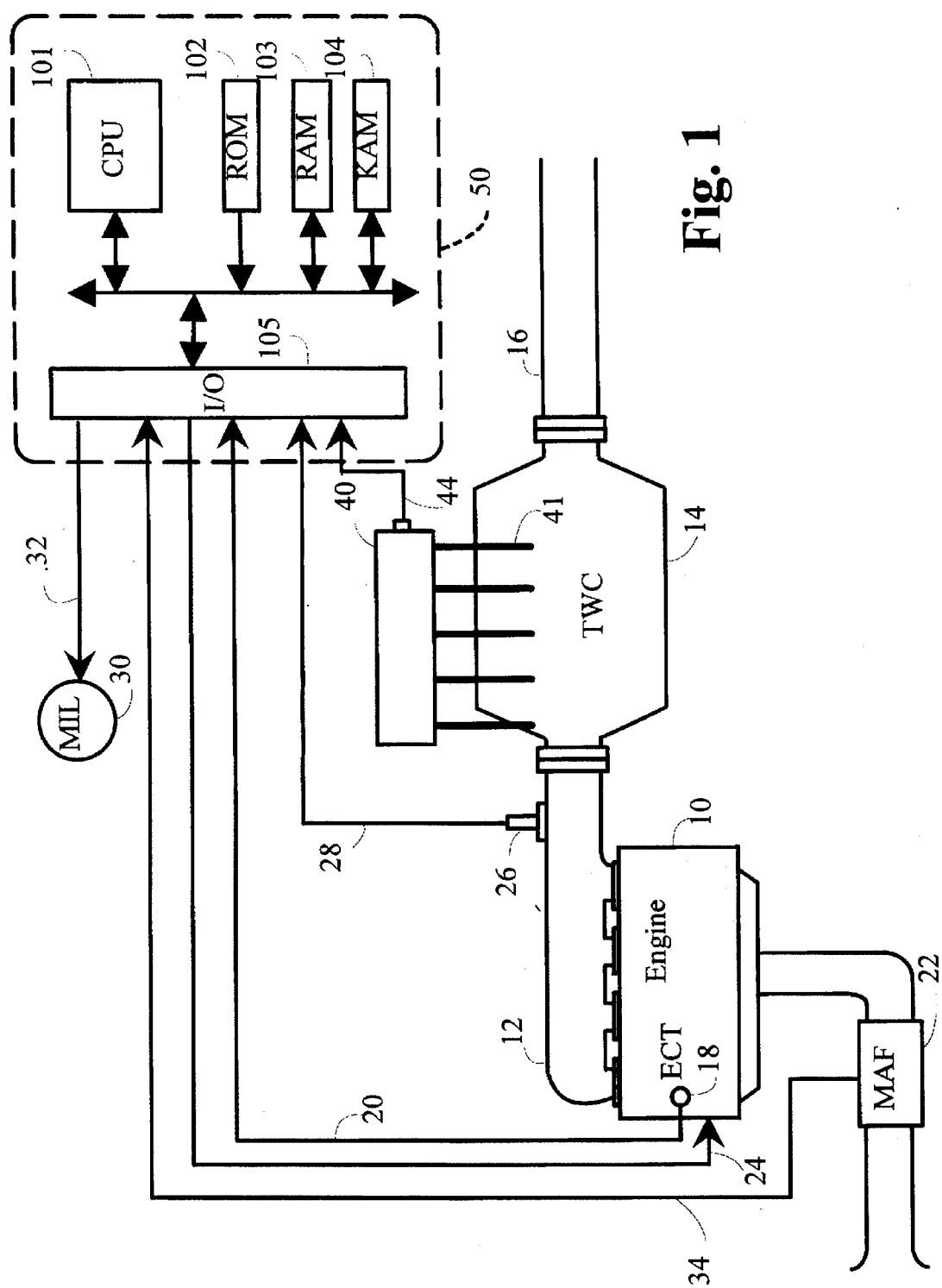
FIG. 1 of the drawings is a schematic illustration of a preferred embodiment.

In FIG. 1 of the drawings an internal combustion engine 10 for a vehicle generates exhaust gas which is transported by an exhaust system which includes a first pipe 12, a three-way catalytic (TWC) converter 14 and a second pipe 16. The first pipe 12 includes an exhaust manifold for transporting exhaust gas from combustion chambers of the engine to the TWC converter 14. The TWC converter 14 operates in a conventional chemical manner, reducing nitrogen oxides and oxidizing hydrocarbons and carbon monoxide in the exhaust gas, which is transported from the TWC converter 14 by second pipe 16. The engine 10 includes an engine coolant temperature (ECT) sensor 18 for detecting the temperature of engine coolant circulating within the engine. The ECT sensor 18 preferably takes the form of a thermistor which transmits an ECT signal 20, which is indicative of engine coolant temperature, to Electronic Engine Controller (EEC) 50. A Mass AirFlow (MAF) sensor 22 is positioned before the intake manifold 24 of the engine to detect the mass flow rate of air entering the intake manifold. The MAF sensor 22 preferably takes the form of a hot wire anemometer which transmits a MAF signal 24, which is indicative of the mass flow rate of air entering the intake manifold 24, to the EEC 50. A Heated Exhaust Gas Oxygen (HEGO) sensor 26 positioned upstream of the TWC converter 14 on the first pipe 12 detects the equilibrium concentration of oxygen in the exhaust gas generated by the engine and transmits a representative HEGO signal 28 to the EEC 50. A Malfunction Indicator Light (MIL) 30 which is preferably positioned in the passenger compartment of the vehicle, on the instrument panel, provides, in response to a malfunction signal 32, an indication to a driver of the vehicle of a malfunction as determined by the EEC 50. The EEC 50 performs a variety of engine control and diagnostic functions including control of fuel injection and spark timing via a plurality of signals seen generally at 34.

The EEC 50 preferably includes a central processing unit 101, a read-only memory (ROM) 102 for storing control programs, a random-access memory (RAM) 103 for temporary data storage, a keep-alive-memory (KAM) 104 for storing learned values, and a conventional data bus and I/O ports 105 for transmitting and receiving signals to and from engine 10.

A temperature sensor module 40 connects to a plurality of temperature sensors, seen generally at 41, which sense the temperature at spaced intervals of a catalyst material in the TWC converter 14. Each of the temperature sensors 41 generates a signal which is indicative of the temperature in the catalyst material at the location of the temperature sensor and transmits a representative signal to the temperature sensor module 40 which time multiplexes the signals received from each of the temperature sensors 41 and transmits a multiplexed temperature signal 44 to the EEC 50.

Figure 2A:
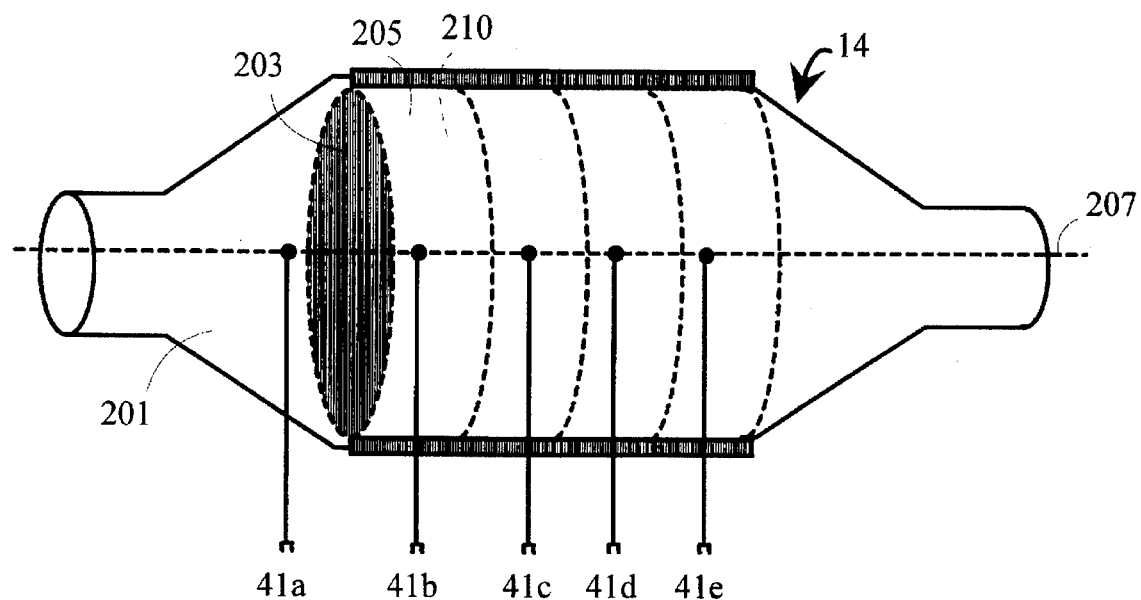
FIGS. 2(a) and 2(b) of the drawings show an expanded view of a portion of FIG. 1.

FIG. 2(a) of the drawings shows in greater detail the positioning of the temperature sensors 41 in the TWC converter 14. As seen in FIG. 2(a), five temperature sensors 41, individually designated as 41a–41e, are preferably used. Each of the temperature sensors 41a–41e preferably takes the form of either a thermocouple, or a thermistor. A first temperature sensor 41a is positioned at the inlet cone 201 of the converter 14, approximately one centimeter from the front face 203 of catalyst brick 205 and senses the temperature of exhaust gas entering the converter 14. The other four temperature sensors 41b–41e are positioned to sense the temperature at spaced intervals of the catalyst brick 205 to sense the temperature of the contacting catalyst substrate. The sensitive region of each temperature sensor 41b–e is located approximately on the center line 207 of the catalyst brick 205. Each temperature sensor 41b–e is spaced at intervals to divide the catalyst brick into approximately equal lengths, as indicated by dotted lines 208.

Figure 2B:
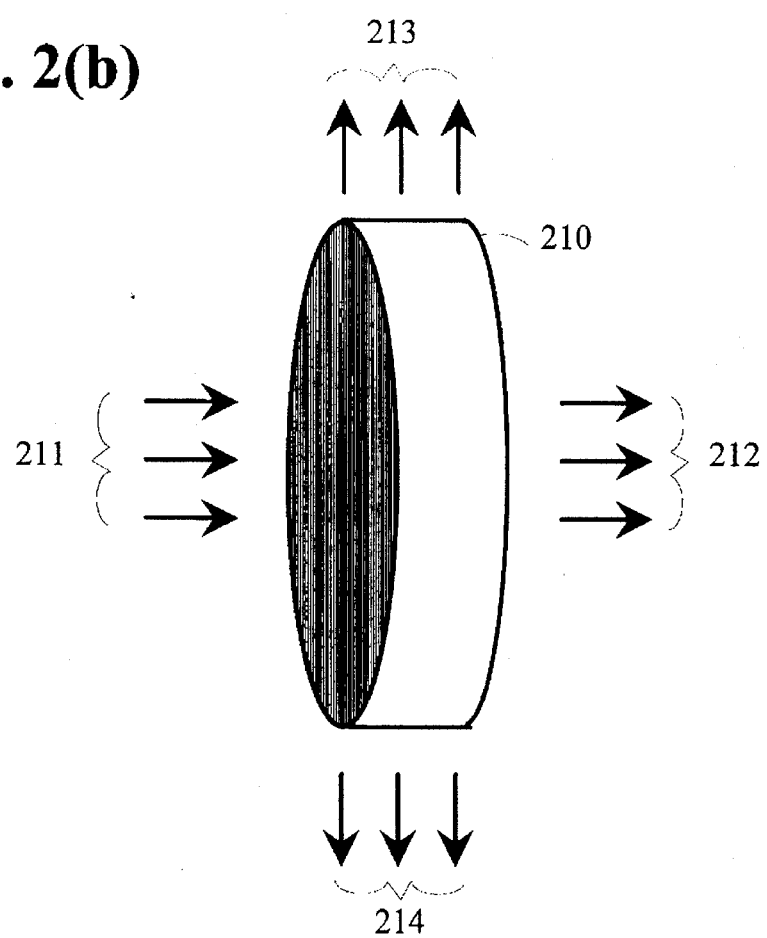

FIG. 2(b) illustrates the flow of energy through a section 210 of the catalyst brick 205. As seen in FIG. 2(b), convective energy seen at 211 enters the section 210. The hydrocarbon and carbon monoxide molecules present in the exhaust flow are, if sufficient oxygen is present, further reacted on the surface of the catalyst section. This exothermic reaction adds to the thermal energy exiting 212 from the section. Thermal energy is lost from the outer wall of the section and this lost energy is indicated by 213 and 214. The basic energy balance which must be met by the energy exchange that takes place between the catalyst substrate and exhaust gas flowing past the substrate is illustrated in the equation below:

$$ROEA = ROCE - ROCO - ROELO + RCEG \quad (1)$$

where,

ROEA is the rate of energy accumulation in the portion of the catalyst brick;

ROCE is the rate of convective energy entering the portion of the catalyst brick;

ROCO is the rate of convective energy exiting the portion of the catalyst brick;

ROELO is the rate of energy loss from the catalyst brick; and

RCEG is the rate of chemical energy generated in the catalyst brick.

A preferred embodiment advantageously provides an indication of the operability of the catalytic converter by generating a value of total energy which is indicative of the total energy generated over a period of time, in which the engine is operated within an operating range which is approximately in accordance with the Federal Test Procedure (FTP). The energy value is then normalized in accordance with the amount of fuel burned by the engine, and the normalized value is compared to a predetermined value. If the predicted FTP hydrocarbon emissions are larger than the specified value by more than a predetermined deviation amount, then an indication is provided that the catalytic converter should be checked.

Figure 3A:
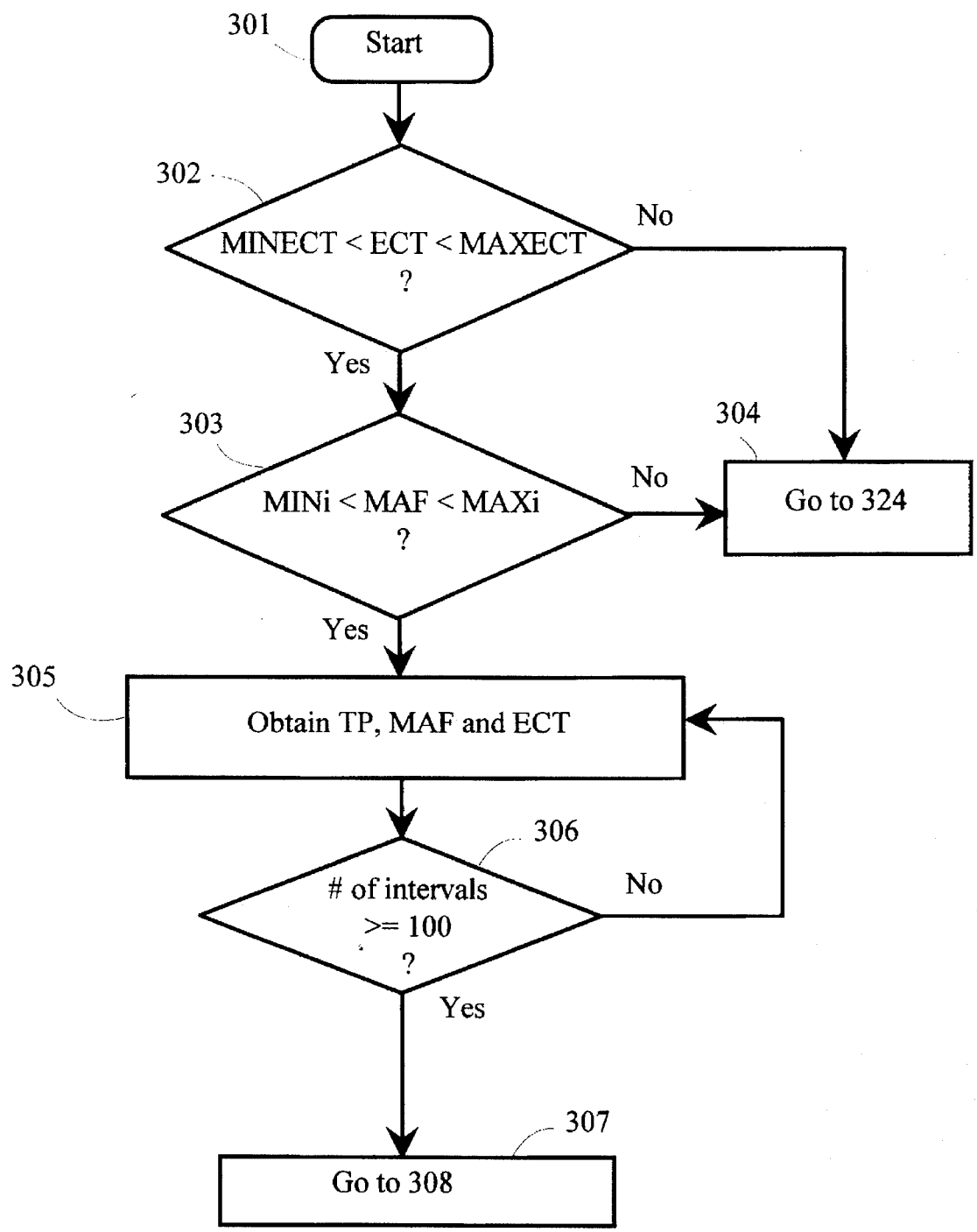
FIGS. 3(a) and 3(b) are flowcharts illustrating the operation of a preferred embodiment.
Figure 3B:
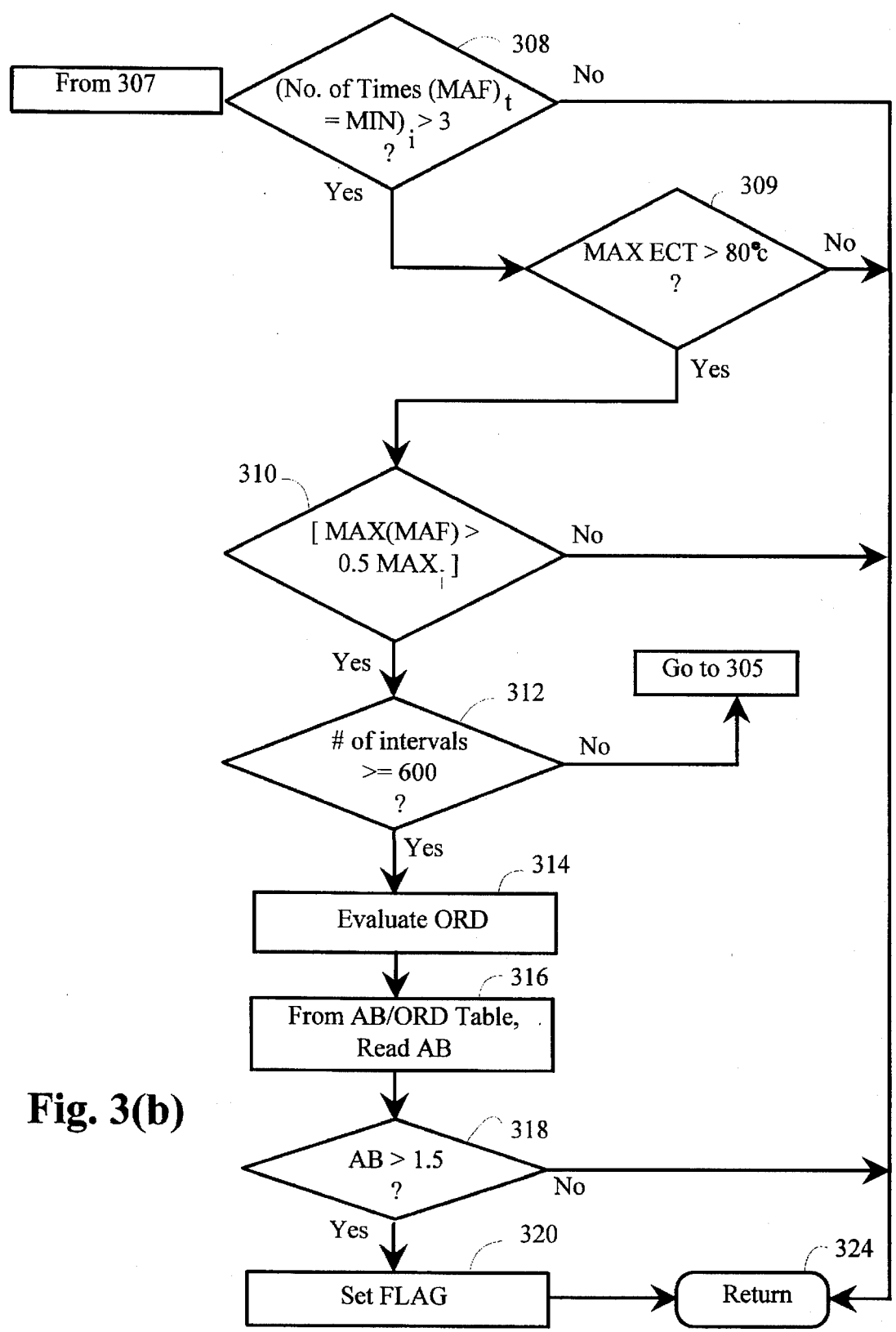

FIGS. 3(a) and 3(b) show the steps of a diagnostic routine executed by a preferred embodiment. The routine shown in FIGS. 3(a) and 3(b) is executed each time the engine is started. The diagnostic routine is entered at step 301 and at steps 302 and 303, two entry conditions are checked to determine if the engine is within a predetermined operating range. At step 302, an engine coolant temperature (ECT) value, which is indicative of engine operating temperature, is generated and compared to minimum (MINECT) and maximum (MAXECT) engine coolant temperature values which together define a range of engine operating temperature in which the diagnostic routine may be performed. If ECT is greater than or equal to MAXECT, or less than or equal to MINECT, the engine operating temperature is determined to be out of range and the diagnostic routine is exited at 324 in FIG. 3(b). At step 303, a Mass AirFlow (MAF) value, which is indicative of the mass flow rate of air into an intake manifold of the engine is generated and compared to minimum (MINi) air flow and maximum (MAXi) air flow values which together define a range of air flow values in which the diagnostic routine may be performed. If MAF is greater than or equal to MAXi, or less than or equal to MINi, the mass flow rate of air is determined to be out of range and the diagnostic routine is exited at step 324. As used by the diagnostic routine, the MAF value provides an indication of the amount of fuel consumed by the engine during the period of measurement.

If both the ECT and MAF values are within their respective ranges, then at steps 305-313 a loop is executed to obtain data preferably at 600 points in time at one second intervals. A temperature value from each of the temperature sensors 41 is obtained and stored as a set of temperature values in memory. As explained in the description accompanying FIG. 2, five temperature sensors are used, with one of the sensors positioned to detect the temperature of exhaust gas entering the catalytic converter and the other four sensors positioned at spaced intervals along the catalyst material to detect the temperature of the catalyst material at each of the spaced intervals.

Also at step 305, an MAF and ECT value are each generated and stored with the set of temperature values to provide an indication of engine torque output and engine operating temperature at the time when the corresponding set of temperature values is generated.

At step 306, a test is performed to determine the number of time intervals for which data has been stored. If one-hundred time intervals have elapsed, then at steps 308-310, a plurality of tests are conducted to determine if the engine is operating within a required operating range. Otherwise step 305 is re-executed to obtain additional data. The tests at steps 308-310 advantageously ensure that the engine is being operated in an acceptable range to satisfy FTP requirements.

At step 308 the MAF value generated and stored at step 305 is compared to a minimum MAF value, and if the MAF value is less than the minimum MAF value, then a counter is incremented to indicate the number of times during the routine, that the MAF value has been below the specified minimum. Next, the value of the counter is checked and if the counter indicates that the MAF value has been less than the minimum MAF value more than three times, then the routine is exited at step 324. Otherwise, at step 308, the ECT value is compared to a predetermined minimum ECT value, which in a preferred embodiment equals 80° C. If the ECT value is less than or equal to the predetermined minimum ECT value, then the routine is exited. Otherwise, at step 310, the MAF value is compared to a maximum MAF value and if the MAF value is not greater one-half of the maximum MAF value then the routine is exited, and no action is taken to activate the MIL.

Otherwise, at step 312, if six-hundred time intervals have not elapsed, then the loop of steps 305–313 is repeated. Otherwise, at step 314, a power value ($\Delta H_{i,t}$), indicative of the total amount of thermal power generated over the six-hundred time intervals, is generated according to the following relationship:

$$H_{i,t} = (T_{i,t+1} - T_{i,t}) * [\epsilon * \rho_{e,x} * C_{p-cat} + (1 - \epsilon) * \rho_{cat} * C_{p-cat}] \quad (2)$$

$$dvol_i + \frac{MA_t + MA_{t+1}}{2} * \rho_{e,x} * C_{p-ex} * \left[ \frac{T_{i,t} + T_{i,t+1}}{2} - T_{i+1,t} + \frac{T_{i+1,t-1}}{2} \right] + h_o * darea_i * \left[ \frac{T_{i,t} + T_{i,t+1}}{2} - T_a \right]$$

where, $T_{i,t}$ is the temperature detected by a particular sensor i at a particular time interval t;

$\epsilon$ is the void fraction of the catalyst substrate;

$\rho_{e,x}$ is the density of exhaust gas;

$C_{p-cat}$ is the heat capacity of the catalyst substrate;

$\rho_{cat}$ is the density of catalyst substrate;

$dvol_i$ is the localized catalyst volume;

$MA_t$ is the volumetric flow rate of exhaust gases passing through the catalytic converter;

$h_o$ is the external heat transfer coefficient; and $darea_i$ is the localized external surface area;

The relationship expressed in equation (2) above assumes a uniform catalyst flow distribution, a uniform temperature distribution in the radial direction (i.e. no radial temperature gradient), no thermal conduction in the axial direction, and finally that gas and solids are in thermal equilibrium.

The total power value is then normalized by a total fuel value which is indicative of the total fuel combusted over the six-hundred time intervals. The total fuel value is preferably generated by summing the MAF values collected over the time intervals. The total power value is then divided by the total fuel value to obtain a normalized power value (ORD). At step 316, the normalized power value is divided by a standard hydrocarbon value to generate a deviation value which is indicative of the amount by which the hydrocarbon emissions deviates from a standard value. The standard value is indicative of a federally generated value and varies according to vehicle type and model year.

At step 318, the deviation value is compared to a predetermined deviation value, which in a preferred embodiment has a value of 1.5. If the deviation value is greater than the predetermined deviation value then at step 320, a flag is set to provide an indication to the vehicle operator that the catalytic converter needs to be checked. Otherwise, the routine is exited at step 324.

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. An on-board monitoring system for a vehicle which includes a catalytic converter to process exhaust gas generated by an internal combustion engine comprising, in combination:

means for initiating a catalytic converter diagnostic test;

means, responsive to the initiation of said diagnostic test and responsive to a plurality of temperature sensing devices positioned at spaced intervals upon said catalytic converter, for generating a plurality of temperature values, each of said temperature values being indicative of the temperature detected by a corresponding temperature sensing device;

means, responsive to at least one engine operating parameter, for determining if said engine is operating within a predetermined operating range;

means, responsive to said engine operating within said predetermined range, for storing said temperature values for a plurality of time intervals to generate a set of stored temperature values;

means responsive to the expiration of said time intervals for retrieving said set of stored temperature values and for generating a total power value indicative of the thermal-power generated by said catalytic converter during said time intervals;

means for comparing said total power value to a predetermined power value; and means for providing an indication if the total power value deviates from the predetermined power value by more than a predetermined deviation amount.

2. The invention as set forth in claim 1 wherein at least one of the temperature sensing devices detects the temperature of exhaust gas entering said catalytic converter and the remainder of the temperature sensing devices detect the temperature of a catalyst substrate in said catalytic converter.

3. The invention as set forth in claim 2 further comprising:

means, responsive to an engine operating temperature sensor, for generating an engine temperature value indicative of engine operating temperature;

means, responsive to a mass air flow sensor positioned upstream of an intake manifold of the engine, for generating an air flow value indicative of the mass flow rate of air entering the intake manifold;

means for periodically comparing said engine temperature value to a predetermined temperature range, and for comparing said air flow value to a predetermined air flow range, means, responsive to said engine temperature value being outside of said predetermined temperature range and said air flow value being outside said air flow range for a predetermined number of times during said time intervals for terminating said diagnostic test.

4. In a vehicle which includes a catalytic converter for processing regulated-exhaust gas emissions generated by an internal combustion engine of the vehicle, a method for detecting the hydrocarbon conversion efficiency of a catalytic converter comprising the steps of:

sensing the operating temperature of the engine and comparing the operating temperatures to a predetermined operating temperature range;

sensing the mass air flow rate into the engine and comparing the mass air flow rate to a predetermined air flow rate range;

if said operating temperature is within said predetermined operating temperature range and said mass air flow rate is within said predetermined air flow rate range, then initiating a diagnostic test which comprises the steps of, periodically measuring at a plurality of time intervals, the temperature of exhaust gas entering the catalytic converter and periodically measuring the temperature of a catalyst substrate in said catalytic converter at a plurality of spaced intervals along said catalyst substrate to generate a plurality of sets of temperature values, each set containing temperature values measured within a particular time interval;

generating from said sets of temperature values a total power value indicative of the thermal power generated by said catalytic converter during said time intervals;

comparing said total power value to a predetermined power value; and providing an indication if the total power value deviates from the predetermined power value by more than a predetermined deviation amount.

5. In a vehicle which utilizes a catalytic converter for processing regulated exhaust gas emissions generated by an internal combustion engine, a method for determining the HC conversion-efficiency of said catalytic converter comprising, in combination:

checking at least a first engine operating parameter to determine if said engine is operating within a predetermined operating range;

if said engine is operating within said predetermined operating range then, measuring the temperature of exhaust gas entering the catalytic converter and measuring the temperature of a catalyst substrate in the catalytic converter at spaced positions along the catalyst substrate for a predetermined number of time intervals;

generating as a function of the measured temperature of the exhaust gas entering the catalytic converter and the measured temperature of the catalyst substrate, an energy value indicative of the total energy generated in the catalyst over said predetermined number of time intervals;

comparing said total energy value to a predetermined total energy value; and providing an indication if the total energy value deviates from the predetermined power value by more than a predetermined deviation amount.

6. The method as set forth in claim 5 comprising the additional step of responding to the engine operating parameter being outside of the predetermined operating range by repeating the step of checking at least the first engine operating parameter to determine if said engine is operating within a predetermined operating range after the passage of at least a predetermined amount of time.

7. The method as set forth in claim 5 wherein the catalyst substrate comprises a plurality of sections, each of said sections having associated therewith a temperature sensor which provides an indication of the temperature of the catalyst substrate in the corresponding section.

8. The method as set forth in claim 5 wherein the first predetermined engine operating parameter is indicative of engine operating temperature.

9. The method as set forth in claim 8 wherein the step of checking at least a first engine operating parameter to determine if said engine is operating within a predetermined operating range comprises the additional step of checking a second engine operating parameter which is indicative of mass air flow rate into an intake manifold of the engine to determine if said engine is operating within a predetermined operating range which includes a cold start and a plurality of acceleration and deceleration conditions.

10. The method as set forth in claim 5 comprising the additional step of comparing the mass air flow entering the intake manifold of the engine to a predetermined air flow range and comparing a value indicative of engine operating temperature to a predetermined engine temperature range and terminating the method if said mass air flow is outside of said predetermined air flow range or if said engine operating temperature is outside of said predetermined engine temperature range.

* * * * *